(12) United States Patent
Noguchi et al.

(10) Patent No.: US 8,489,304 B2
(45) Date of Patent: Jul. 16, 2013

(54) TORQUE DISTRIBUTION CONTROL APPARATUS FOR FOUR-WHEEL DRIVE VEHICLE

(75) Inventors: Masatoshi Noguchi, Wako (JP); Yusuke Sakaguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 311 days.

(21) Appl. No.: 12/824,213

(22) Filed: Jun. 27, 2010

(65) Prior Publication Data

US 2011/0035090 A1    Feb. 10, 2011

(30) Foreign Application Priority Data

Aug. 5, 2009    (JP) ................... 2009-182212

(51) Int. Cl.
| | |
|---|---|
| *B60T 7/12* | (2006.01) |
| *G05D 1/00* | (2006.01) |
| *G06F 7/00* | (2006.01) |
| *G06F 17/00* | (2006.01) |

(52) U.S. Cl.
USPC ............................. 701/90; 701/84

(58) Field of Classification Search
USPC ............................. 701/84, 87–90
See application file for complete search history.

(56) References Cited

U.S. PATENT DOCUMENTS

| | | | | |
|---|---|---|---|---|
| 5,803,197 | A   * | 9/1998 | Hara et al. | 180/248 |
| 2004/0092363 | A1 * | 5/2004 | Maekawa | 477/74 |
| 2005/0150702 | A1 * | 7/2005 | Matsuzaki | 180/197 |
| 2007/0084659 | A1 * | 4/2007 | Hamrin et al. | 180/233 |

FOREIGN PATENT DOCUMENTS

| | | |
|---|---|---|
| JP | 03-128729 | 5/1991 |
| JP | 03-279026 | 12/1991 |
| JP | 07-017279 | 1/1995 |
| JP | 07-172204 | 7/1995 |
| JP | 08-002276 | 1/1996 |
| JP | 08-002277 | 1/1996 |
| JP | 09-033550 | 2/1997 |
| JP | 09-177962 | 7/1997 |
| JP | 11-351864 | 12/1999 |
| JP | 4082548 B2 | 10/2001 |

* cited by examiner

*Primary Examiner* — Thomas Tarcza
*Assistant Examiner* — Imran Mustafa
(74) *Attorney, Agent, or Firm* — Ditthavong Mori & Steiner, P.C.

(57) ABSTRACT

A torque distribution control apparatus for a four-wheel drive vehicle includes a torque distribution controller configured to control a sub-driving-wheel distribution torque to be transmitted to right and left sub-driving wheels via right and left torque distribution clutches in accordance with a target distribution torque. A driving-torque calculator is configured to calculate a driving torque output from a driving source. A target-distribution-torque calculator is configured to calculate the target distribution torque to be distributed to the sub-driving wheels in accordance with the driving torque. A target-distribution-torque correction device is configured to correct the target distribution torque to increase when the target distribution torque is lower than or equal to a first threshold value and an increase rate of the target distribution torque is higher than or equal to a second threshold value.

6 Claims, 6 Drawing Sheets

TORQUE DISTRIBUTION CONTROL APPARATUS FOR FOUR-WHEEL DRIVE VEHICLE

CROSS REFERENCES TO RELATED APPLICATIONS

The present application claims priority under 35 U.S.C. §119 to Japanese Patent Application No. 2009-182212, filed Aug. 5, 2009, entitled "Torque Distribution Control Device for Four-Wheel Drive Vehicle." The contents of this applications are incorporated by reference in their entirety.

BACKGROUND OF THE INVENTION

1. Field of the Invention

The present invention relates to a torque distribution control apparatus for a four-wheel drive vehicle.

2. Description of the Related Art

Japanese Patent No. 4082548 discloses an electronically controlled four-wheel drive vehicle in which the driving torque to be distributed from an engine to sub-driving wheels is set on the basis of a driving state of a vehicle obtained from fuel injection (FI) information (e.g., engine speed, suction negative pressure, suction air amount), automatic transmission (AT) information (e.g., shift position, torque ratio of torque converter), and antilock brake system (ABS) information (e.g., vehicle speed, brake signal).

When a state of a four-wheel drive vehicle including main driving wheels and sub-driving wheels is changed from a deceleration state in which an accelerator pedal is not pressed to an acceleration state in which the accelerator pedal is pressed, backlash of gears caused during deceleration in a power transmission system from the engine to the main driving wheels vanish at once during acceleration, and this causes rattling noise of the gears. Moreover, when the engine speed is lower than or equal to an idling speed, rattling noise of the gears is continuously caused by the changes in engine speed.

In this case, the driving torque of the engine is transmitted only to the main driving wheels when the accelerator pedal is not pressed. In contrast, when the accelerator pedal is pressed, the driving torque of the engine is also transmitted to the sub-driving wheels because of engagement of torque distribution clutches in a rear differential gear. Hence, backlash of the gears vanishes at once because of load of driving of the sub-driving wheels, and this causes rattling noise. Moreover, since rattling noise is continuously caused by the change in engine speed, noise/vibration (NV) performance and merchantability are reduced.

Unfortunately, when a deceleration state or a coasting state in which the vehicle moves only by inertia is changed to an acceleration state, rattling noise cannot be sufficiently reduced only by normal torque distribution control that transmits the driving torque to the sub-driving wheels via the rear differential gear. Hence, there is a demand to further reduce rattling noise. In addition, on a road surface having a low coefficient of friction, if the torque rise characteristic of the sub-driving wheels delays while the accelerator pedal is pressed during steering (turning), driving is performed only by the main driving wheels (front wheels) for a moment, and this may cause understeering during turning.

Accordingly, it is desirable to effectively reduce rattling noise caused in gears when a driving state of a four-wheel drive vehicle is changed from a deceleration state or a coasting state in which the vehicle moves only by inertia to an acceleration state, and to improve understeering to neutral steering when an accelerator pedal is pressed on a road surface having a low coefficient of friction.

SUMMARY OF THE INVENTION

According to an aspect of the present invention, a torque distribution control apparatus for a four-wheel drive vehicle includes a torque distribution controller, a driving-torque calculator, a target-distribution-torque calculator, and a target-distribution-torque correction device. The torque distribution controller is configured to control a sub-driving-wheel distribution torque to be transmitted to right and left sub-driving wheels via right and left torque distribution clutches in accordance with a target distribution torque. The vehicle includes right and left main driving wheels to which a driving torque output from a driving source is directly transmitted and the right and left sub-driving wheels to which the driving torque is transmitted via right and left torque distribution clutches. The driving-torque calculator is configured to calculate the driving torque output from the driving source. The target-distribution-torque calculator is configured to calculate the target distribution torque to be distributed to the sub-driving wheels in accordance with the driving torque. The target-distribution-torque correction device is configured to correct the target distribution torque to increase when the target distribution torque is lower than or equal to a first threshold value and an increase rate of the target distribution torque is higher than or equal to a second threshold value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

An embodiment of the present invention will be described below with reference to FIGS. 1 to 6.

Figure 1:
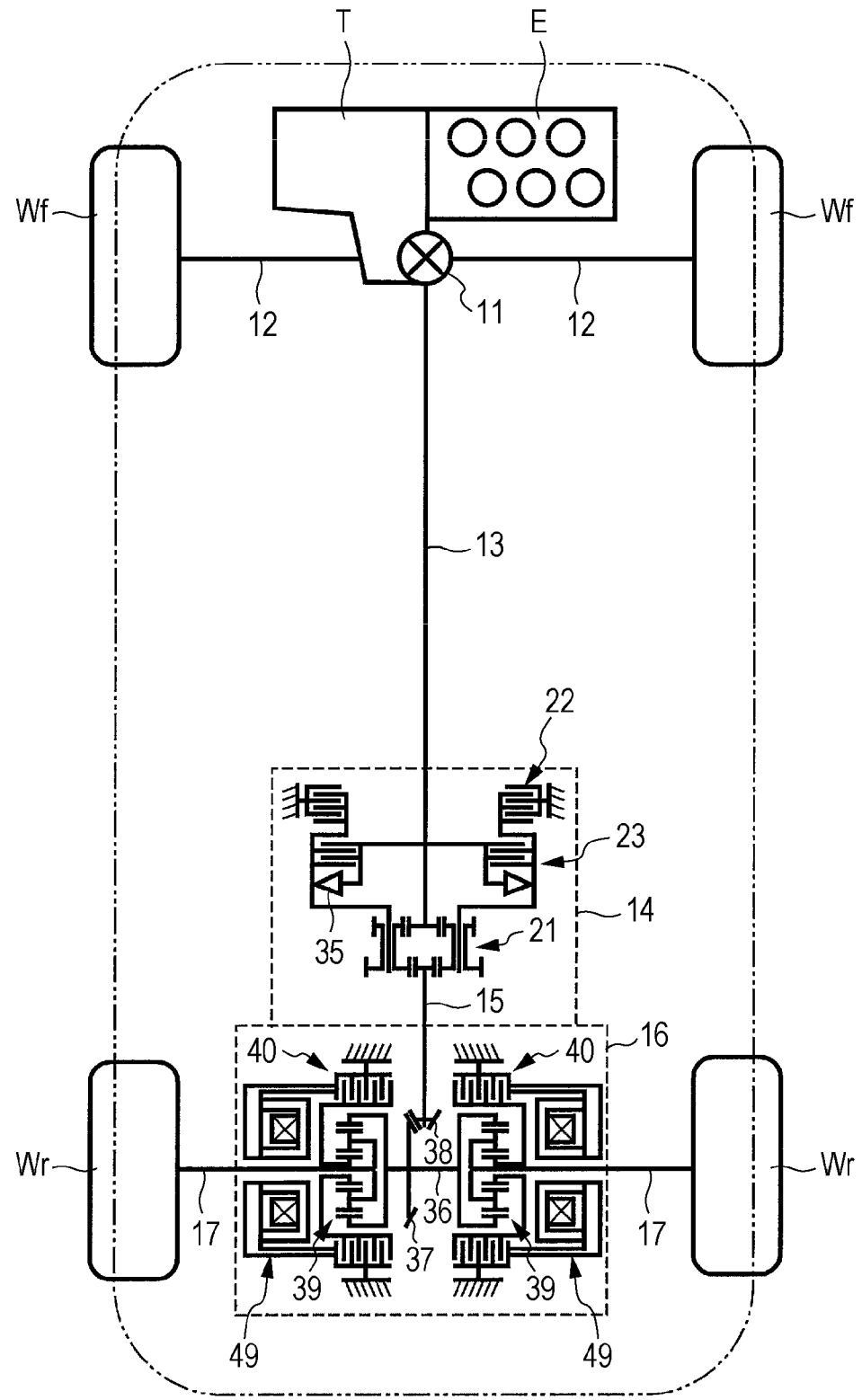
FIG. 1 illustrates a driving-force transmission system of a four-wheel drive vehicle.

Referring to FIG. 1, a four-wheel drive vehicle to which the embodiment of the present invention is applied includes right and left front wheels Wf serving as main driving wheels, and right and left rear wheels Wr serving as sub-driving wheels. Basically, during driving of the vehicle, the right and left front wheels Wf are constantly driven, and the right and left rear wheels Wr are appropriately driven in accordance with a driving state of the vehicle.

A manual transmission T is connected to an engine E that is transversely mounted at the front of a vehicle body, and is also connected to the right and left front wheels Wf via a front differential gear 11 and right and left front drive shafts 12. The front differential gear 11 is connected to the right and left rear wheels Wr via a transfer (not shown), a front propeller shaft 13, a speed-increasing device 14, a rear propeller shaft 15, a rear differential gear 16, and right and left rear drive shafts 17.

Figure 2:
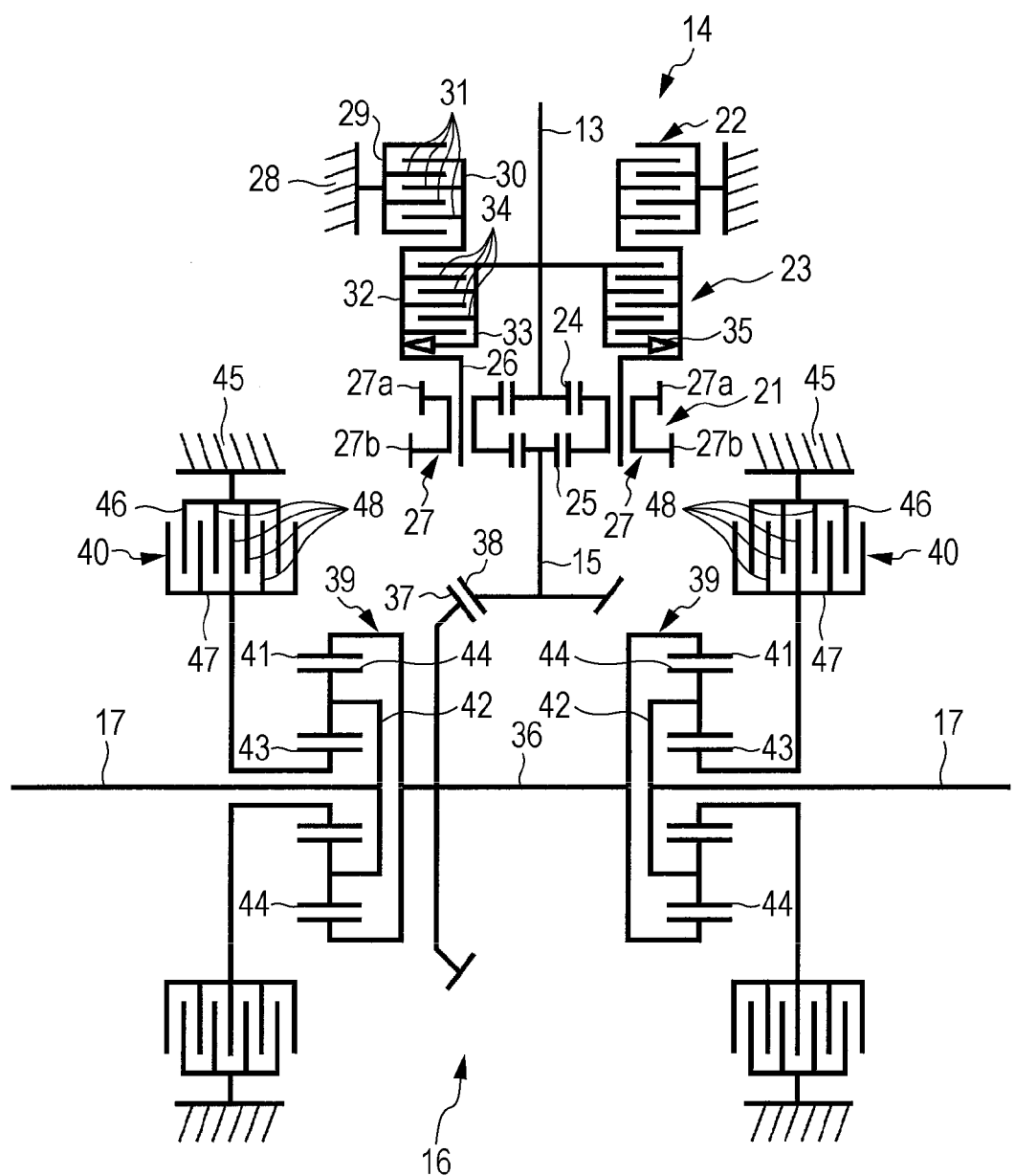
FIG. 2 is an enlarged view of a speed-increasing device and a rear differential gear.

As shown in FIG. 2, the speed-increasing device 14 includes a planetary gear mechanism 21, a speed-increasing clutch 22, and a directly-coupled clutch 23.

The planetary gear mechanism 21 includes an input-side sun gear 24 fixed to a rear end of the front propeller shaft 13, an output-side sun gear 25 fixed to a front end of the rear propeller shaft 15, a carrier 26, and a plurality of double pinions 27 supported by the carrier 26. Each double pinion 27 has an input-side pinion 27a and an output-side pinion 27b provided integrally. The number of teeth of the output-side pinion 27b is set to be larger than the number of teeth of the input-side pinion 27a. Correspondingly, the number of teeth of the output-side sun gear 25 is set to be smaller than the number of teeth of the input-side sun gear 24.

The speed-increasing clutch 22 is of a hydraulic multi-plate type. In the speed-increasing clutch 22, a clutch outer 29 fixed to a housing 28 and a clutch inner 30 provided on an inner side of the clutch outer 29 oppose with a plurality of frictional engaging elements 31 being disposed therebetween. When the frictional engaging elements 31 are engaged by the supply of hydraulic pressure, the clutch inner 30 is engaged with the clutch outer 29 and is thereby restrained by the housing 28 so as not to rotate.

The directly-coupled clutch 23 is of a hydraulic multi-plate type, and includes a clutch outer 32 provided integrally with the clutch inner 30 of the speed-increasing clutch 22 and the carrier 26 of the planetary gear mechanism 21, a clutch inner 33 provided integrally with the front propeller shaft 13, a plurality of frictional engaging elements 34 provided between the clutch outer 32 and the clutch inner 33, and a one-way clutch 35 provided between the clutch outer 32 and the clutch inner 33. When the rotation speed of the clutch inner 33 exceeds the rotation speed of the clutch outer 32, the one-way clutch 35 slips to block transmission of the driving force. When the frictional engaging elements 34 are engaged by the supply of hydraulic pressure, the clutch outer 32 is engaged with the clutch inner 33, so that the front propeller shaft 13 is combined with the carrier 26 of the planetary gear mechanism 21.

Accordingly, when the speed-increasing clutch 22 is engaged and the directly-coupled clutch 23 is disengaged, the carrier 26 of the planetary gear mechanism 21 is restrained by the housing 28 so as not to rotate. Hence, the rotation speed of the front propeller shaft 13 is increased by the speed increasing ratio (e.g., 1.05) determined by the numbers of teeth of the input-side sun gear 24, the output-side sun gear 25, and the double pinions 27, and the increased rotation speed is output to the rear propeller shaft 15.

Conversely, when the speed-increasing clutch 22 is disengaged and the directly-coupled clutch 23 is engaged, the input-side sun gear 24 and the carrier 26 of the planetary gear mechanism 21 are combined into a lock state, so that the rotation of the front propeller shaft 13 is output to the rear propeller shaft 15 without any change.

Since the rear differential gear 16 has a structure that is substantially symmetrical with respect to the vehicle center plane in the front-right direction, only a structure of a part on the left side of the vehicle center plane will be described below.

A driven bevel gear 37 is fixed to a center portion of an input shaft 36 coaxially provided between opposing ends of the left and rear drive shafts 17, and engages with a driving bevel gear 38 fixed to a rear end of the rear propeller shaft 15. Between the input shaft 36 and the left rear drive shaft 17, a planetary gear mechanism 39 and an electromagnetic multi-plate torque distribution clutch 40 are provided.

The planetary gear mechanism 39 includes a ring gear 41, a carrier 42, a sun gear 43, and a plurality of pinions 44 that are supported by the carrier 42 and simultaneously engage with the ring gear 41 and the sun gear 43. The ring gear 41 is coupled to a left end of the input shaft 36, and the carrier 42 is coupled to a right end of the left rear drive shaft 17.

The torque distribution clutch 40 includes a clutch outer 46 fixed to a housing 45, a clutch inner 47 coupled to the sun gear 43 in the planetary gear mechanism 39, a plurality of frictional engaging elements 48 provided between the clutch outer 46 and the clutch inner 47, and an electromagnetic actuator 49 (see FIG. 1) that engages the frictional engaging elements 48 so as to combine the clutch outer 46 and the clutch inner 47.

Wave springs (not shown) are provided between the frictional engaging elements 48 in the torque distribution clutch 40, and resilient forces of the wave springs bias the frictional engaging elements 48 in a direction such as to separate the frictional engaging elements 48 from one another, thereby preventing a drag torque from being produced in the torque distribution clutch 40. Although a drag torque can be avoided by the wave springs, the load necessary to bring the frictional engaging elements 48 into tight contact increases, and this reduces the engagement response of the torque distribution clutch 40.

In a state in which the electromagnetic actuator 49 is off, the torque distribution clutch 40 is disengaged, and therefore, the sun gear 43 is freely movable. Hence, the driving force of the input shaft 36 is not transmitted to the right and left rear drive shafts 17. In contrast, in a state in which the electromagnetic actuator 49 is on and the torque distribution clutch 40 is engaged, the sun gear 43 is restrained by the housing 45 so as not to rotate. Hence, the driving force of the input shaft 36 is transmitted to the right and left rear drive shafts 17.

In this case, when the slip amount of the torque distribution clutch 40 is changed by changing the current to be supplied to the electromagnetic actuator 49, the torque to be transmitted from the input shaft 36 to the right and left rear drive shafts 17 can be changed continuously.

Accordingly, by changing the engaging forces of the right and left torque distribution clutches 40 of the rear differential gear 16, the ratio of torques distributed between the front wheels Wf and the rear wheels Wr can be arbitrarily controlled, and the ratio of torques distributed between the right and left rear wheels Wr can be controlled arbitrarily.

Figure 3:
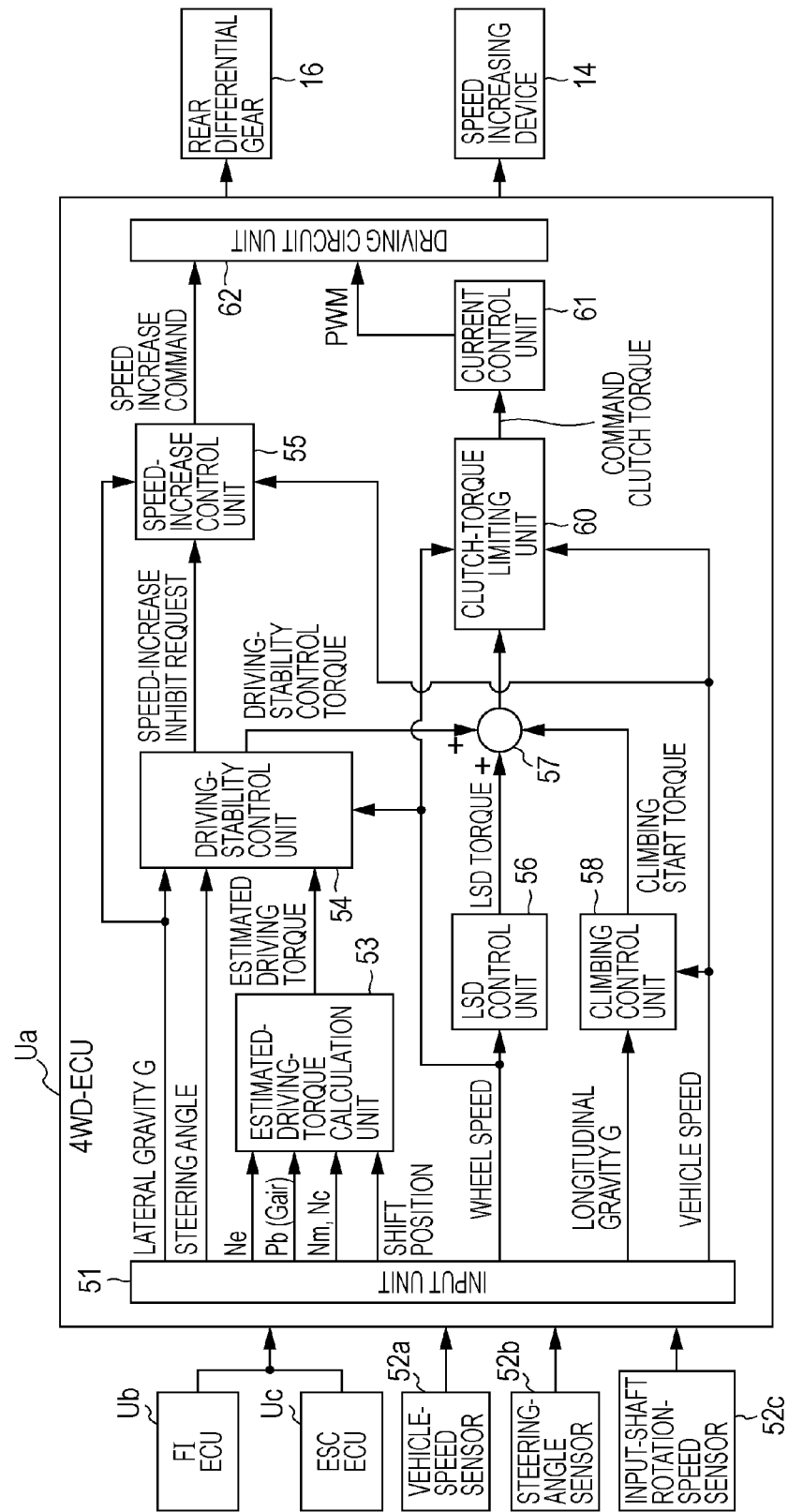
FIG. 3 is a block diagram of a four-wheel drive electronic control unit.

Next, a description will be given of a four-wheel drive (4WD) electronic control unit Ua for controlling operations of the speed-increasing device 14 and the rear differential gear 16, with reference to FIG. 3.

An FI electronic control unit Ub for controlling the operation of the engine E and an electronic stability control (ESC) electronic control unit Uc for controlling the operation of a vehicle-behavior stabilization system are connected via a controller area network (CAN) to an input unit 51 of the 4WD electronic control unit Ua. Further, a vehicle-speed sensor 52a for detecting the vehicle speed, for example, from the rotation speed of a gear in the manual transmission T, a steering-angle sensor 52b for detecting the steering angle of a steering wheel, and an input-shaft rotation-speed sensor 52c for detecting the rotation speed of the input shaft 36 in the rear differential gear 16 are connected to the input unit 51. The rotation speed to be detected by the input-shaft rotation-speed sensor 52c can be replaced with a rotation speed obtained by multiplexing the average front-wheel speed by the gear ratio of the manual transmission T.

Signals input from the FI electronic control unit Ub to the input unit 51 include the engine speed, suction negative pressure (or suction flow rate), and gear ratio calculated from the ratio of the rotation speed of the main shaft of the manual transmission T and the rotation speed of the countershaft. Further, signals input from the ESC electronic control unit Uc to the input unit 51 include the wheel speeds of the front wheels Wr and the rear wheels Wr, lateral acceleration of the vehicle, and longitudinal acceleration of the vehicle.

An estimated-driving-torque calculator 53 calculates an estimated driving torque output from the manual transmission T on the basis of the engine rotation speed, the suction negative pressure (or suction flow rate), and the gear ratio calculated from the ratio of the rotation speed of the main shaft and the rotation speed of the countershaft, which are input from the input unit 51.

When an automatic transmission is adopted instead of the manual transmission T, the gear ratio does not need to be calculated, but can be obtained from the shift position of the automatic transmission.

A driving-stability control unit 54 calculates a driving-stability control torque to be distributed to the right and left rear wheels Wr on the basis of the estimated driving torque calculated by the estimated-driving-torque calculator 53 and the lateral acceleration, steering angle, and wheel speeds input from the input unit 51. For example, when the slip angle of the vehicle is larger than or equal to a predetermined value, the driving-stability control unit 54 determines that vehicle behavior is unstable, and controls the rear differential gear 16 so as to reduce the torque to be distributed to the right and left rear wheels Wr and to reduce the torque to be distributed to a turning outside wheel of the right and left rear wheels Wr, thereby stabilizing the vehicle behavior.

When the vehicle speed is medium and the lateral acceleration is high, a speed-increase control unit 55 engages the speed-increasing clutch 22 of the speed-increasing device 14 so as to increase the rotation speed of the rear propeller shaft 15 with respect to the rotation speed of the front propeller shaft 13, and distributes the torque to a turning outside wheel of the right and left rear wheels Wr by the rear differential gear 16, thereby improving turning performance while avoiding understeering of the vehicle. When the vehicle speed is low or high and the lateral acceleration is low, the speed-increase control unit 55 engages the directly-coupled clutch 23 of the speed-increasing device 14, and stops the operation of increasing the rotation speed of the rear propeller shaft 15 with respect to the rotation speed of the front propeller shaft 13. In this state, the speed-increase control unit 55 distributes the torque to the turning outer wheel of the right and left rear wheels Wr by the rear differential gear 16 so as to ensure a stable turning performance.

When the driving-stability control unit 54 outputs a request to inhibit the speed increase because the speed increase may disturb the vehicle behavior, operation of the speed-increasing device 14 is inhibited.

A limited slip differential (LSD) control unit 56 compares the wheel speeds of the right and left front wheels Wf with the wheel speeds of the right and left rear wheels Wr. When the front wheels Wr slip because the frictional coefficient of a road surface on which the front wheels Wr move at the start of the vehicle is lower than the frictional coefficient of a road surface on which the rear wheels Wr move, the LSD control unit 56 calculates an LSD torque to be distributed to the rear wheels Wr in accordance with a rotation speed difference between the front wheels and the rear wheels. When the LSD torque is distributed to the rear wheels Wr by the rear differential gear 16, the slip of the front wheels Wf is reduced, and the vehicle is allowed to smoothly start moving.

A climbing control unit 58 compares an actual longitudinal acceleration detected by a longitudinal-acceleration sensor with an estimated longitudinal acceleration obtained by differentiating the vehicle speed so as to calculate a climbing angle (gradient of an uphill road) of the vehicle. Then, the climbing control unit 58 calculates a climbing start torque to be distributed to the rear wheels Wr by the rear differential gear 16 in accordance with the climbing angle in order to increase the climbing force used when the vehicle starts moving on the uphill road.

A torque addition unit 57 adds the driving-stability control torque calculated by the driving-stability control unit 54, the LSD torque calculated by the LSD control unit 56, and the climbing start torque calculated by the climbing control unit 58.

A clutch-torque correction unit 60 increases a target value of the driving torque to be distributed to the rear wheels Wr by the rear differential gear 16 when pressing an accelerator pedal in order to change a deceleration state in which the accelerator pedal is not pressed to an acceleration state, thereby preventing the gear provided in the transmission system for the driving force of the engine E from producing rattling noise, and increasing the engagement response of the torque distribution clutches 40 for distributing the driving torque to the rear wheels Wr. This control will be described in detail below with reference to FIG. 4.

A current control unit 61 converts a clutch torque command calculated by the clutch-torque correction unit 60 into a current value (PWM value) to be supplied to the electromagnetic actuators 49 of the torque distribution clutches 40 in the rear differential gear 16.

Then, a driving circuit unit 62 controls the operation of the rear differential gear 16 on the basis of the current value output from the current control unit 61.

Next, with reference to FIG. 4, a description will be given of logic of correction control of the target distribution torque of the rear differential gear 16 exerted in the clutch-torque correction unit 60 when the state of the vehicle is changed from a deceleration state or a coasting state, in which the vehicle moves only by inertia, to an acceleration state.

For example, when turning the corner, the driver decelerates the vehicle by releasing the accelerator pedal and depressing the brake pedal from the entrance of the corner through the first half, and accelerates the vehicle by releasing the brake pedal and depressing the accelerator pedal from to the exit of the corner through the second half. When the brake pedal is depressed, the right and left torque distribution clutches 40 of the rear differential gear 16 are disengaged, and the rear drive shafts 17 of the rear wheels Wr are disconnected from the input shaft 36. Therefore, the driving torque that the front wheels Wf receive from the road surface when the brake pedal is depressed is reversely transmitted from the front drive shafts 13 to the engine E via the front differential gear 11 and the manual transmission T, which brings about a so-called engine brake state.

When the driver accelerates the vehicle by depressing the accelerator pedal in this state, the driving torque of the engine E is transmitted to the front wheels Wr through a route reverse to the above-described route. Hence, contacting tooth surfaces of the gears provided in the power transmission system between the engine E and the front wheels Wf are reversed, and rattling noise thereby occurs. In particular, a gear in a transfer for connecting the front differential gear 11 and the front propeller shaft 13 produces a large rattling noise.

However, when the torque distribution clutches 40 of the rear differential gear 16 are engaged with acceleration of the vehicle, part of the driving torque of the engine E is distributed to the rear wheels Wr. Hence, the load at this time prevents the contacting tooth surfaces of the gears from being rapidly reversed, and suppresses rattling noise. In this case, by temporarily increasing the target value of the driving torque to be distributed to the rear wheels Wr by the rear differential gear 16 immediately after the accelerator pedal is depressed, the effect of suppressing rattling noise can be enhanced further.

As described above, when the wave springs are provided between the frictional engaging elements 48 of the torque distribution clutches 40 so as to avoid drag, the engagement response of the torque distribution clutches 40 decreases. However, by temporarily increasing the target value of the driving torque to be distributed to the rear wheels Wr by the rear differential gear 16, the engagement response of the torque distribution clutches 40 can be increased, and the driving torque to the rear wheels Wr can be transmitted without any delay.

Figure 4:
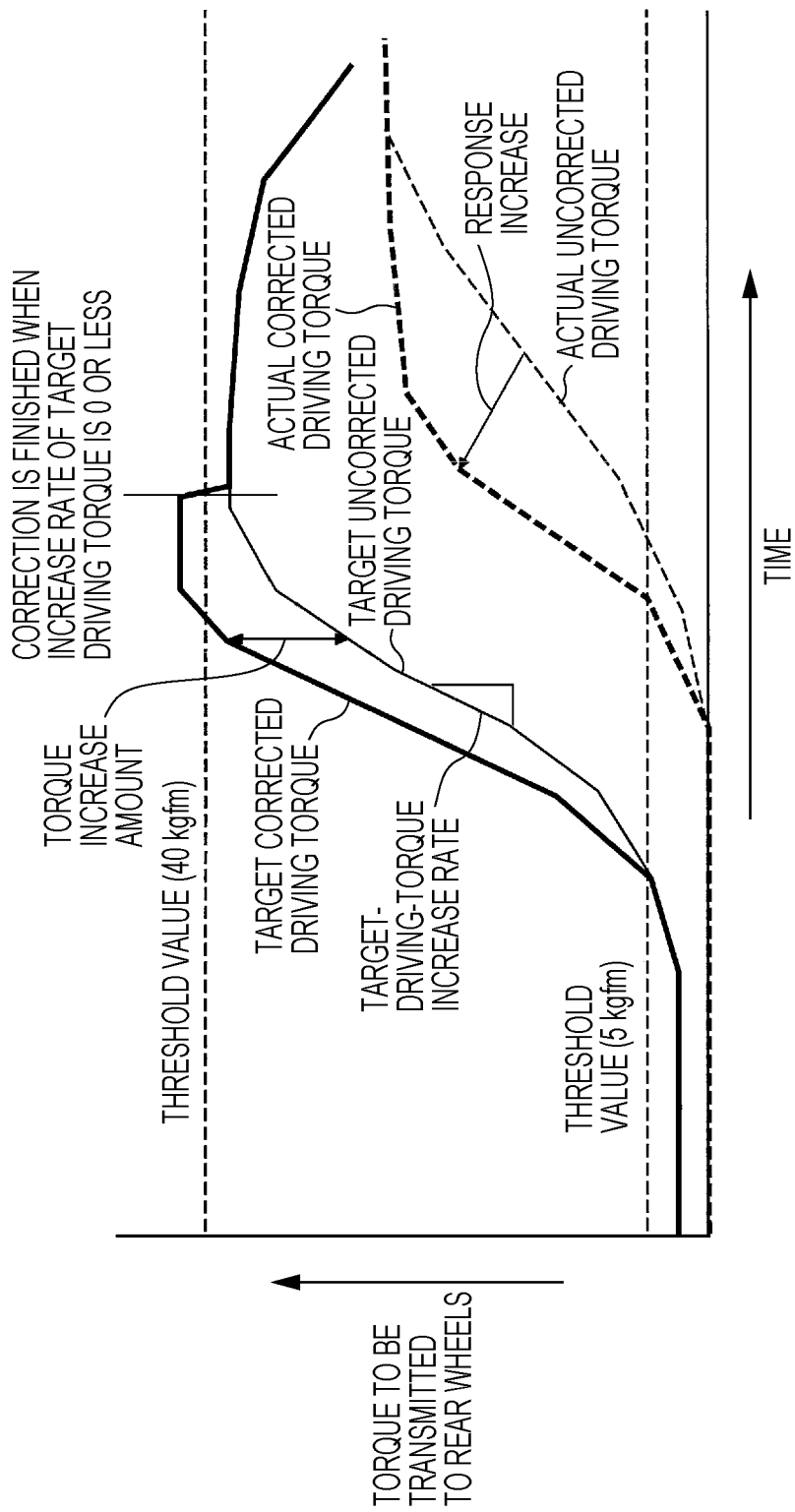
FIG. 4 is a graph showing changes made in a target driving torque and an actual driving torque when an accelerator pedal is pressed.

In FIG. 4, a thin solid line indicates an uncorrected target driving torque before this control (toque to be transmitted to the rear wheels Wr with the torque distribution clutches 40 engaged), and a thick solid line indicates a corrected target driving torque after the control. A thin broken line indicates an actual driving torque before the control, and a thick broken line indicates an actual driving torque after the control.

A corrected target driving torque is adding a driving-stability control torque, an LSD torque, and a climbing start torque by the torque addition unit 57, and is to be output to the clutch-torque correction unit 60.

The clutch-torque correction unit 60 corrects the uncorrected target driving torque to a corrected target driving torque when all of the following conditions (1) to (3) are satisfied:

(1) The rotation speed difference of the left torque distribution clutch 40 of the rear differential gear 16 and the rotation speed difference of the right torque distribution clutch 40 both exceed a predetermined value (50 rpm in the embodiment).
(2) The uncorrected target driving torque is lower than or equal to a predetermined value (5 kgfm in the embodiment: first threshold value).
(3) The increase rate per unit time by which the uncorrected target driving torque rises is higher than or equal to a predetermined value (3 kgfm in the embodiment: second threshold value).

The rotation speed difference of the torque distribution clutch in the above condition (1) is defined by (input-side rotation speed)−(output-side rotation speed) of the torque distribution clutch, that is, (rotation speed of the input shaft 36)−(rotation speed of the rear drive shaft 17).

The above condition (1) is set for the following reason. The fact that the rotation speed differences of the torque distribution clutches 40 exceed the predetermined value means a state in which the rotation speed of the input shaft 36 becomes higher than the rotation speed of the rear drive shafts 17 and a sufficient driving torque is transmitted from the engine E to the rear wheels Wr. In this state, rattling noise will not be produced even when the accelerator pedal is depressed rapidly.

The above condition (2) is set for the following reason. The uncorrected target distribution torque is increased on the assumption that the accelerator pedal is not depressed, the engine brake operates, and the driving torque is reversely transmitted from the front wheels Wf to the engine E, that is, rattling noise is produced by pressing the accelerator pedal. For that purpose, it is necessary that the uncorrected target driving torque should be lower than or equal to the first threshold value.

The above condition (3) is set to detect that the contacting tooth surfaces of the gears in the transfer gear that particularly produce rattling noise are switched from deceleration tooth surfaces to acceleration tooth surfaces by rapidly depressing the accelerator pedal. The increase rate of the uncorrected target driving torque per unit time can be calculated by dividing the difference between the current uncorrected target driving torque and the previous uncorrected target driving torque that are calculated in every predetermined cycle time by the cycle time.

The above condition (1) can be omitted, as required.

Figure 5:
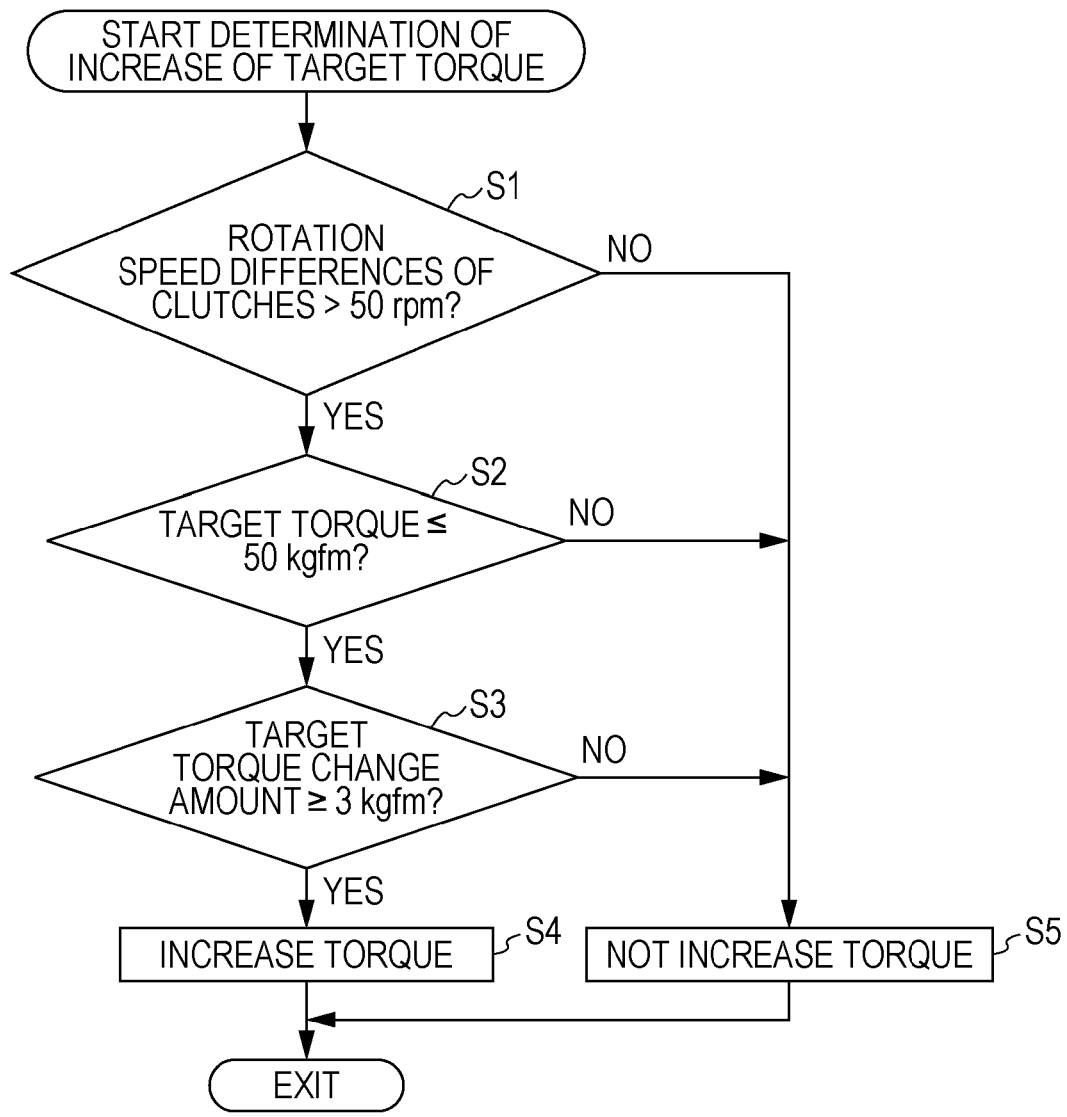
FIG. 5 is a flowchart showing a control start condition.

FIG. 5 is a flowchart showing the above-described operations. When the rotation speed differences of the right and left torque distribution clutches 40 both exceed 50 rpm in Step S1, the uncorrected target driving torque is lower than or equal to 5 kgfm in Step S2, and the increase rate of the uncorrected target driving torque per unit time is higher than or equal to 3 kgfm in Step S3, the target driving torque is increased for correction in Step S4. If any of Steps S1 to S3 is not satisfied, correction is not made in Step S5.

The condition where the above correction is finished is that at least one of the following conditions (4), (5), and (6) is satisfied:

(4) The uncorrected target distribution torque is higher than or equal to a predetermined value (40 kgfm in the embodiment).
(5) The increase rate of the uncorrected target distribution torque is zero or less.
(6) The rotation speed difference of at least one of the right and left torque distribution clutches 40 of the rear differential gear 16 is less than or equal to a predetermined value (50 rpm in the embodiment: third threshold value).

The above condition (4) is set for the following reason. When the uncorrected target distribution torque is higher than or equal to 40 kgfm, the effect of reducing rattling noise and the effect of improving the engagement response of the torque distribution clutches 40 can be achieved without increasing the uncorrected target distribution torque. Further, when the control range is enlarged to a high target torque side, an excessive torque may occur and damage the driving system.

The above condition (5) is set for the following reason. When the increase rate of the uncorrected target distribution torque becomes negative, press of the accelerator pedal by the driver has been completed, and there is no need to further increase the uncorrected target distribution torque. If the increasing operation is continued, damage to the driving system may increase.

The above condition (6) is set for the following reason. The fact that the rotation speed difference of the torque distribution clutch 40 is less than or equal to the predetermined value means a state in which the rotation speed of the rear drive shaft 17 with respect to the rotation speed of the input shaft 36 increases, and little driving force is transmitted from the engine E to the rear wheels Wr or the driving torque is reversely transmitted from the rear wheels Wr to the engine E. This state is likely to occur in the torque distribution clutch 40 connected to the rear wheel Wr serving as the turning outer wheel whose rotation speed increases.

When the uncorrected target distribution torque is increased in a state in which the rotation speed difference of the torque distribution clutch 40 is less than or equal to the predetermined value, the negative driving torque to be reversely transmitted from the rear wheels Wr to the engine E may be increased. As a result, the driving torque to be transmitted to the rear wheels Wr is undesirably decreased, and a desired effect is not achieved.

The above conditions (4) and (5) can be omitted, as required.

Figure 6:
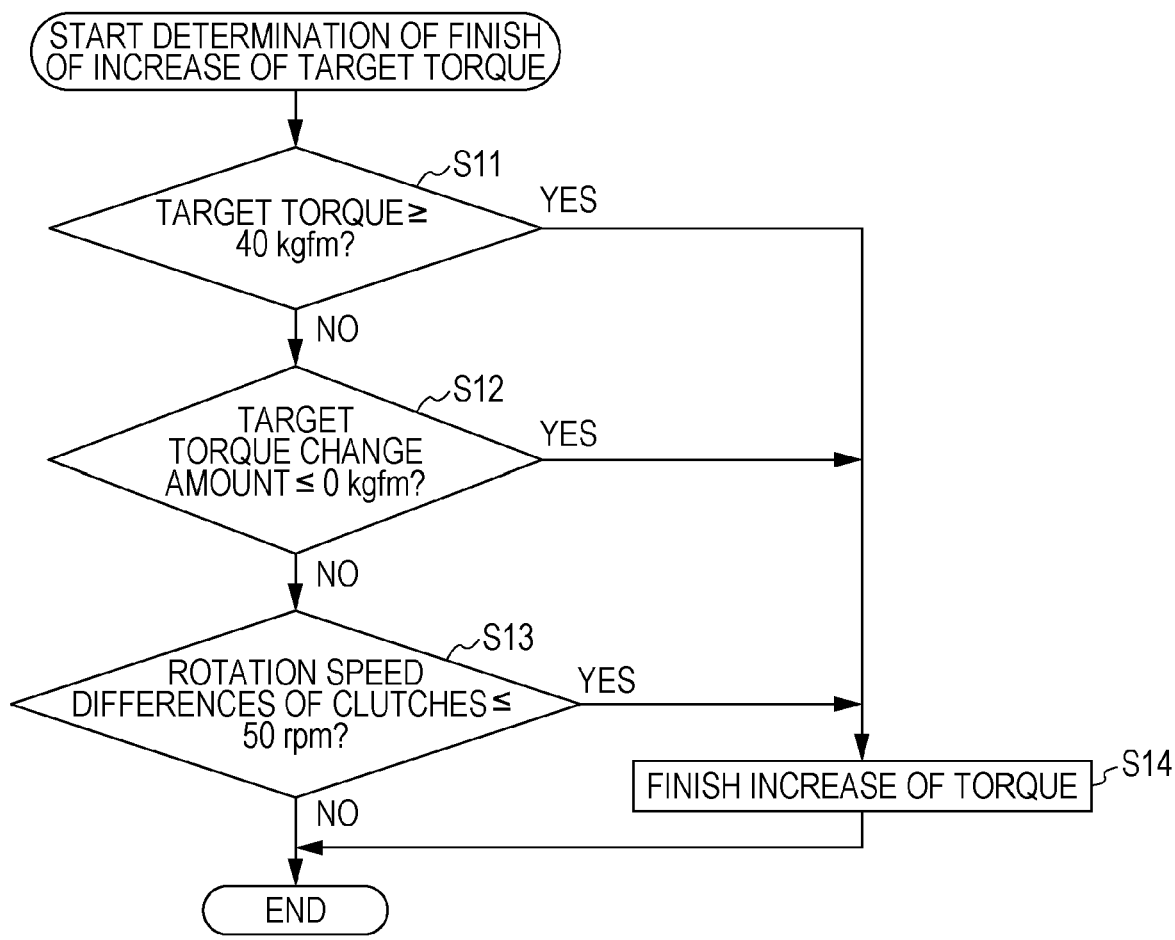
FIG. 6 is a flowchart showing a control finish condition.

FIG. 6 shows the above-described operations. When the increase rate of the uncorrected target distribution torque per unit time is higher than or equal to 40 kgfm in Step S11 or is lower than or equal to 0 in Step S12, or when both of the different rotations of the right and left torque distribution clutches 40 are less than or equal to 50 rpm in Step S13, control for increasing the uncorrected target driving torque may be finished in Step S14.

As described above, when the target distribution torque to be distributed from the engine E to the rear wheels Wr via the rear differential gear 16 is higher than or equal to the first threshold value (5 kgfm) and the increase rate of the target distribution torque per unit time is higher than or equal to the second threshold value (3 kgfm), the clutch-torque correction unit 60 increases the target distribution torque for correction. Hence, even if rattling noise is caused when the contacting tooth surfaces of the gears provided in the power transmission system are reversed while the deceleration state or the coasting state, in which the vehicle moves only by the inertia, is changed to the acceleration state by the driver's press of the accelerator pedal and even if the NV performance and merchantability are reduced when the rattling noise continues because of the change in engine rotation speed, the rattling noise and reduction of the performance can be suppressed by increase the engaging force of the torque distribution clutches 40 in the rear differential gear 16 so as to apply the load to the power transmission system. Moreover, the torque distribution clutches 40 are quickly engaged, and this makes it possible to increase the control response for distributing the driving torque of the engine E to the rear wheels Wr and to prevent the vehicle from understeering.

When the clutch rotation speed difference obtained by subtracting the output-side rotation speed from the input-side rotation speed of the torque distribution clutches 40 are less than or equal to the third threshold value (50 rpm), that is, when the torque distribution clutches 40 reversely transmit the driving force from the rear wheels Wr to the engine E and this may undesirably decrease the driving torque to be transmitted to the rear wheels Wr, the decrease in the driving torque to be transmitted to the rear wheels Wr may be prevented by finishing increasing the target distribution torque for correction.

While the embodiment of the present invention has been described above, various design variations are possible without departing from the scope of the invention.

For example, the driving source of the embodiment of the present invention is not limited to the engine E, and may be a motor generator or a combination of the engine E and the motor generator.

While the four-wheel drive vehicle of the embodiment adopts the manual transmission T, it can adopt an automatic transmission.

According to the embodiment of the present invention, when the driving-torque calculator calculates a driving torque to be output from the driving source, the target-distribution-torque calculator calculates a target distribution torque to be distributed to the sub-driving wheels on the basis of the driving torque. When the target distribution torque is lower than or equal to the first threshold value and the time increase rate of the target distribution torque is higher than or equal to the second threshold value, the target-distribution-torque correction device increases the target distribution torque for correction. Hence, even if rattling noise due to backlash of gears provided in the power transmission system is caused by delay of rise an actual driving torque produced in the sub-driving wheels and the change in engine speed when the vehicle shifts from a deceleration state or a coasting state, in which the vehicle moves only by the inertia, to an acceleration state by the driver's press of the accelerator pedal, the rattling noise can be reduced by improving the engagement response of the torque distribution clutches so as to quickly apply load to the power transmission system. Moreover, since the torque distribution clutches can be quickly engaged and the response of control for distributing the driving torque of the driving source to the subs-driving wheels can be enhanced, the turning behavior on a road surface having a low coefficient of friction can be improved from understeering to neutral steering.

Preferably, the target-distribution-torque correction device finishes increasing the target distribution torque when a clutch rotation speed difference obtained by subtracting an output-side rotation speed from an input-side rotation speed of at least one of the torque distribution clutches is less than or equal to a third threshold value.

In this case, when the clutch rotation speed difference obtained by subtracting the output-side rotation speed from the input-side rotation speed of at least one of the torque distribution clutches is less than or equal to the third threshold value, that is, when the torque distribution clutches reversely transmit the driving force from the sub-driving wheels to the driving source and this may undesirably decrease the driving torque to be transmitted to the sub-driving wheels, the target-distribution-torque correction device finishes increasing the target distribution torque, thereby preventing the decrease in the driving torque to be transmitted to the sub-driving wheels.

An engine E of an embodiment corresponds to the driving source of the present invention, front wheels Wf of the embodiment correspond to the main driving wheels of the invention, rear wheels Wr of the embodiment correspond to the sub-driving wheels of the invention, an estimated-driving-torque calculator 53 of the embodiment corresponds to the driving-torque calculator of the invention, a driving-stability control unit 54, an LSD control unit 56, and a climbing control unit 58 of the embodiment correspond to the target-distribution-torque calculator of the invention, and a clutch-torque correction unit 60 of the embodiment corresponds to the target-distribution-torque correction device of the invention.

Obviously, numerous modifications and variations of the present invention are possible in light of the above teachings. It is therefore to be understood that within the scope of the appended claims, the invention may be practiced otherwise than as specifically described herein.

What is claimed is:

1. A torque distribution control apparatus for a four-wheel drive vehicle, comprising:
   a torque distribution controller configured to control a sub-driving-wheel distribution torque to be transmitted to right and left sub-driving wheels via right and left torque distribution clutches in accordance with a target distribution torque, the vehicle including right and left main driving wheels to which a driving torque output from a driving source is directly transmitted and the right and left sub-driving wheels to which the driving torque is transmitted via right and left torque distribution clutches;
   a driving-torque calculator configured to calculate the driving torque output from the driving source;

a target-distribution-torque calculator configured to calculate the target distribution torque to be distributed to the sub-driving wheels in accordance with the driving torque;

a rate determiner configured to determine that a rate of increase of the target distribution torque per unit time is higher than or equal to a second threshold value; and a target-distribution-torque corrector configured to correct the target distribution torque to increase when the target distribution torque is lower than or equal to a first threshold value and when the rate determiner determines that the rate increase of the target distribution torque is higher than or equal to the second threshold value.

2. The torque distribution control apparatus according to claim 1, wherein the target-distribution-torque corrector finishes increasing the target distribution torque when a clutch rotation speed difference obtained by subtracting an output-side rotation speed from an input-side rotation speed of at least one of the torque distribution clutches is less than or equal to a third threshold value.

3. A torque distribution control apparatus for a four-wheel drive vehicle, comprising:

torque distribution controlling means for controlling a sub-driving-wheel distribution torque to be transmitted to right and left sub-driving wheels via right and left torque distribution clutches in accordance with a target distribution torque, the vehicle including right and left main driving wheels to which a driving torque output from a driving source is directly transmitted and the right and left sub-driving wheels to which the driving torque is transmitted via right and left torque distribution clutches;

driving-torque calculating means for calculating the driving torque output from the driving source;

target-distribution-torque calculating means for calculating the target distribution torque to be distributed to the sub-driving wheels in accordance with the driving torque;

rate determination means for determining that a rate of increase of the target distribution torque per unit time is higher than or equal to a second threshold value; and target-distribution-torque correcting means for correcting the target distribution torque to increase when the target distribution torque is lower than or equal to a first threshold value and when the rate determination means determines that the rate of increase of the target distribution torque per unit time is higher than or equal to the second threshold value.

4. The torque distribution control apparatus according to claim 3, wherein the target-distribution-torque correcting means finishes increasing the target distribution torque when a clutch rotation speed difference obtained by subtracting an output-side rotation speed from an input-side rotation speed of at least one of the torque distribution clutches is less than or equal to a third threshold value.

5. The torque distribution control apparatus according to claim 1, further comprising:

a rate calculator configured to calculate the rate of increase of the target driving torque based on a difference between a current uncorrected target driving torque and a previous uncorrected target driving torque that are calculated by the target-distribution-torque calculator.

6. The torque distribution control apparatus according to claim 3, further comprising:

rate calculating means for calculating the rate of increase of the target driving torque based on a difference between a current uncorrected target driving torque and a previous uncorrected target driving torque that are calculated by the target-distribution-torque calculating means.

* * * * *